(12) United States Patent
Patel et al.

(10) Patent No.: US 6,191,541 B1
(45) Date of Patent: Feb. 20, 2001

(54) SOLID STATE TAIL LIGHT FOR AIRCRAFT

(75) Inventors: Anish Vikram Patel, Odessa; Timothy Scott Kielbon, Lutz; Gregory Alfred Bernotas, Largo; Todd Christopher Knight, Tampa; Raymond Henry Draves, Safety Harbor, all of FL (US)

(73) Assignee: Godfrey Engineering, Inc., Oldsmar, FL (US)

( * ) Notice: Under 35 U.S.C. 154(b), the term of this patent shall be extended for 0 days.

(21) Appl. No.: 09/166,348

(22) Filed: Oct. 5, 1998

(51) Int. Cl.[7] .................................................. G05F 1/00
(52) U.S. Cl. .............................. 315/307; 315/77; 362/296
(58) Field of Search ................................... 315/307, 77, 78, 315/82, 83, 32, 35, 46, 49, 50, 56; 307/10.1, 10.8; 340/581, 582, 815.4, 815.45; 701/14; 363/89

(56) References Cited

U.S. PATENT DOCUMENTS

| | | | |
|---|---|---|---|
| 4,233,652 | * | 11/1980 | Oswald ................................... 315/83 |
| 4,597,033 | * | 6/1986 | Meggs et al. ......................... 362/183 |
| 5,040,022 | * | 8/1991 | Kinoshita et al. ................... 355/206 |
| 5,184,114 | * | 2/1993 | Brown .................................... 340/701 |
| 5,406,172 | * | 4/1995 | Bennett ................................... 315/49 |
| 5,600,206 | * | 2/1997 | Cashin .................................... 315/32 |
| 5,661,645 | * | 8/1997 | Hochstein ............................... 363/89 |
| 5,767,934 | * | 6/1998 | Goddard ................................. 315/50 |
| 5,783,909 | * | 7/1998 | Hochstein ............................... 363/89 |
| 5,838,247 | | 11/1998 | Bladowski ....................... 340/815.45 |
| 5,929,568 | * | 7/1999 | Eggers ................................... 315/56 |
| 5,984,494 | * | 11/1999 | Chapman et al. .................. 362/470 |

* cited by examiner

*Primary Examiner*—Don Wong
*Assistant Examiner*—Thuy Vinh Tran
(74) *Attorney, Agent, or Firm*—Renner, Otto, Boisselle & Sklar; William E. Zitelli (57) ABSTRACT

The present invention includes a vehicle light and method for use in applications experiencing vibrational loading and wide temperature variations. The light includes a solid state illumination device and a thermal compensator in thermal communication with the solid state illumination device. The thermal compensator operates to maintain the solid state illumination device above a temperature threshold.

21 Claims, 7 Drawing Sheets

SOLID STATE TAIL LIGHT FOR AIRCRAFT

FIELD OF THE INVENTION

The present invention relates generally to a light for an aircraft or other application where the light is subjected to temperature changes and vibration.

BACKGROUND OF THE INVENTION

Aircraft use various external lights in order to provide functional illumination as well as positional indication. For example, the front lights of an aircraft are used primarily for illumination purposes while the lights on the wing tips and the tail are used primarily to indicate the location of the various aircraft components. Such external lights, for example, the tail light, experience substantial vibrational loading during aircraft operation. This causes a substantially high failure rate in prior art external lights employing incandescent type bulbs due to the fragility of the filament. Consequently, the external tail light is typically replaced about every ten (10) days. This periodic replacement of the external light is expensive both in terms of the replacement bulb cost and the labor cost associated with the bulb replacement. Therefore there is a need in the art for a more reliable external light for aircraft.

SUMMARY OF THE INVENTION

The present invention relates to a light and associated method having particular use with an aircraft. The light includes a solid state illumination device, for example, one or more light emitting diodes (LEDs), and a thermal compensator which maintains the temperature of the illumination device above a minimum threshold or in accordance with some other temperature criteria. A substantial improvement in reliability over prior art incandescent bulbs having fragile filaments arises from the use of the solid state illumination device because the solid state illumination device is substantially rugged and performs well in environments experiencing high vibrational loading, thus substantially reducing the replacement and maintenance costs for the external light. On the other hand, desired performance under changing temperature conditions is assured by the thermal compensator.

More particularly, the light and associated method provide illumination over a broad temperature range by providing thermal compensation for the solid state illumination device. When the light is subjected to low temperatures, such as when the aircraft is at high altitudes, the thermal compensator provides compensation to maintain the illumination device above a predetermined threshold temperature above which the solid state illumination device may efficiently operate.

According to another aspect of the present invention, a vehicle light includes a solid state illumination device which contains a plurality of discrete illumination elements. Each of the elements have an illumination axis and at least one of the elements has such an axis which is not parallel with some of the other illumination elements for providing a desired illumination pattern. Consequently, the solid state illumination device may be configured in a variety of ways to provide a customized illumination pattern.

According to still another aspect of the present invention, a light unit includes a housing having a solid state illumination device carried thereby. The housing has an optical window that allows light from the illumination device to pass therethrough. The light unit also includes a heater which is carried by the housing, which heater maintains a temperature of the illumination device above a temperature threshold, within a prescribed temperature or performance range, etc.

Although the present invention was conceived and developed for an external aircraft light and is described chiefly in this context, the principles of the invention in their broader aspects can be adapted to nonaircraft lighting systems where substantial vibrational loading make conventional incandescent bulbs unreliable and where the system experiences substantial fluctuations in the thermal environment. The present invention contemplates such other applications.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention will now be described with reference to the drawings wherein like reference numerals are used to refer to like elements throughout. The present invention relates to a solid state light and illumination method employing thermal compensation in order to maintain one or more selected light components above a minimum threshold. The light includes a solid state illumination device such as one or more LEDs. The light further includes a heating device such as a foil heater to maintain the illumination device above the desired temperature threshold. Use of a thermally compensated solid state light provides illumination over a substantial range of temperatures and provides a substantial improvement over prior art incandescent bulbs in lighting environments which experience high vibrational loading. Additional features of the present invention will be further appreciated in light of the detailed description below.

Figure 1:
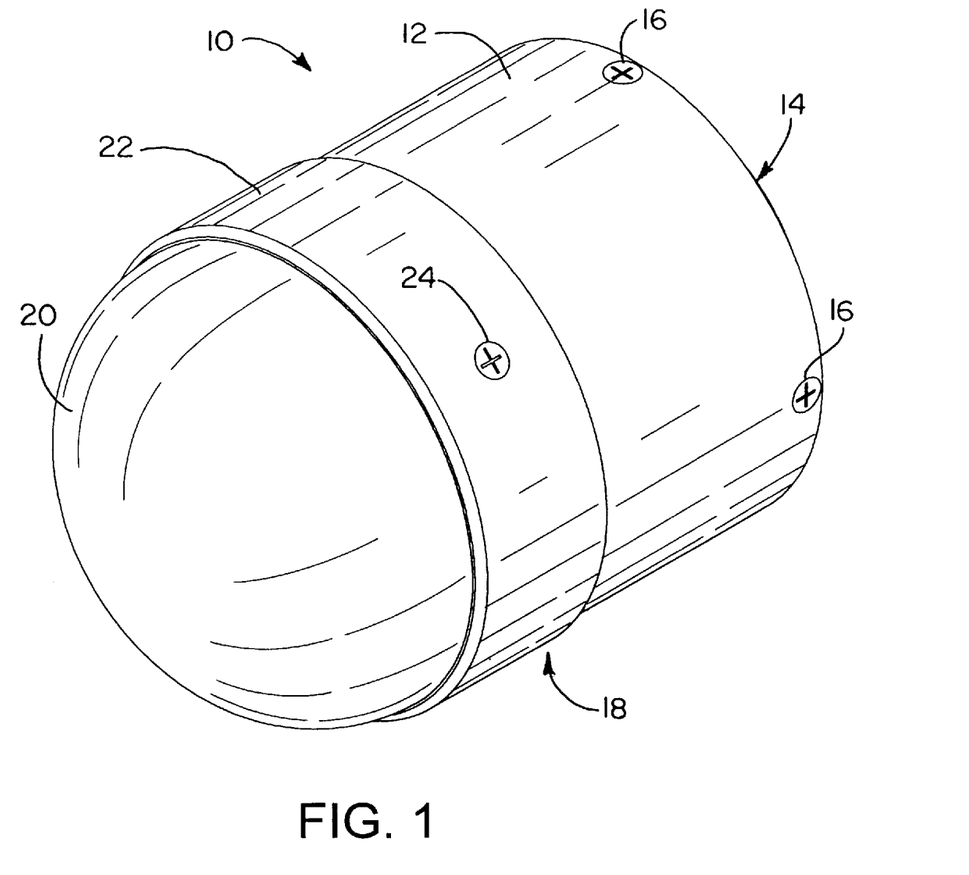
FIG. 1 is a perspective view of a solid state tail light for an aircraft according to the present invention.

Turning now to the Figures, a solid state light is illustrated in FIG. 1 and is indicated at reference numeral 10. The light 10 includes a housing 12 containing various light components therein. A back portion 14 of the housing 12 engages the aircraft or other type vehicle via a mounting bracket and a gasket (not shown) which are secured to the housing 12 via screws 16. The gasket preferably provides thermal insulation and EMI insulation for the light 10. Power is also transmitted to the light 10 from the aircraft through the back portion 14. A front portion 18 of the housing 12 abuts a light enclosure 20 or optical window which protects internal light components from damage while concurrently providing an optical window for transmitting light therethrough. The light enclosure 20 is coupled to the housing 12 with a collar or ferrule 22 which attaches to the housing 12 via screws 24.

Figure 2:
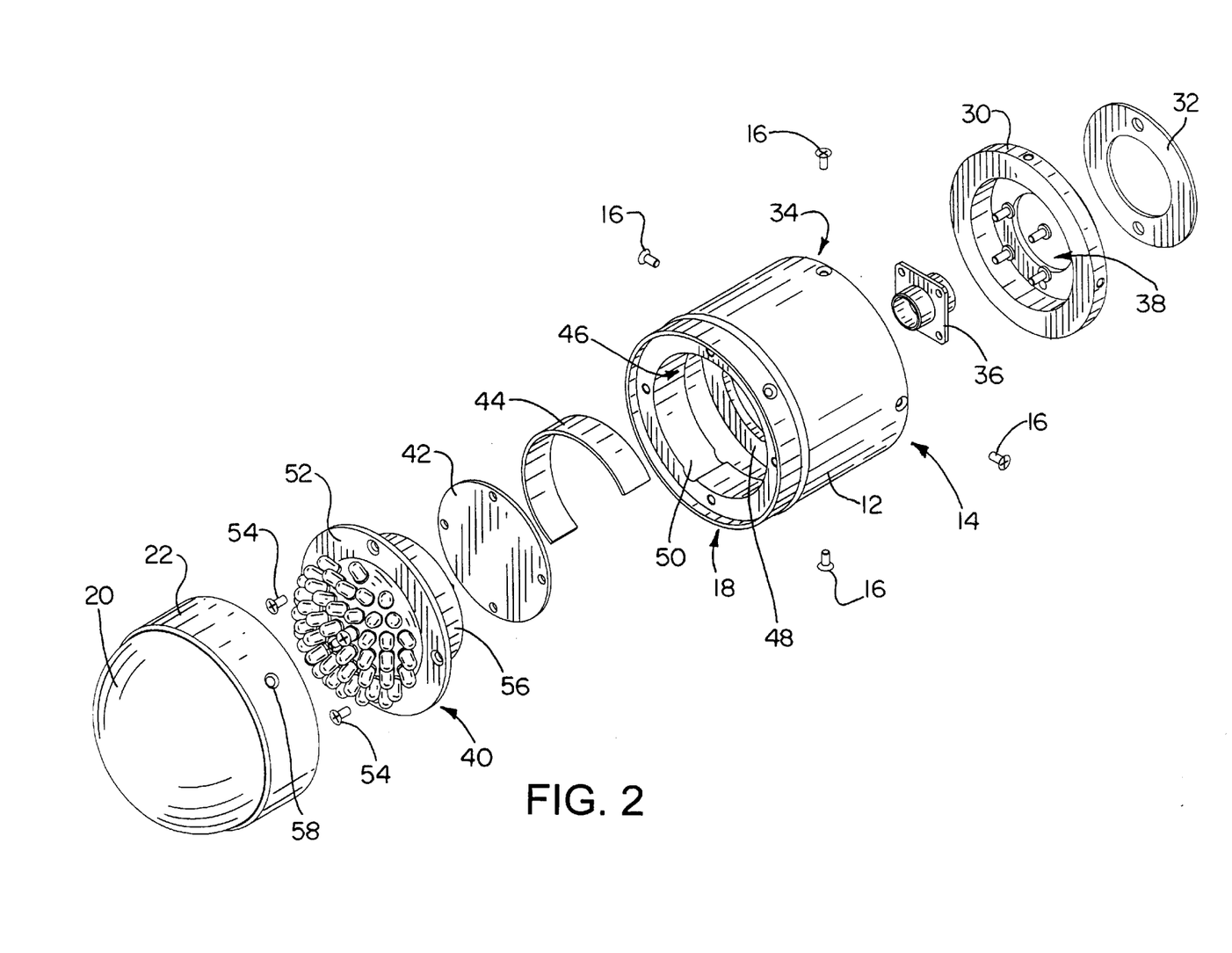
FIG. 2 is an exploded perspective view of the solid state tail light of FIG. 1.

An exploded, perspective view of the light 10 of FIG. 1 according to a preferred embodiment of the present invention is illustrated in FIG. 2, which also includes the various internal components of the light 10. FIG. 2 includes the housing 12, the enclosure 20 and the ferrule 22 of FIG. 1 and further includes a mounting bracket 30 and a gasket 32 that were discussed in conjunction with, but not illustrated, in FIG. 1. The mounting bracket 30 engages a counterbore 34 in the back portion 14 of the housing 12 and is secure thereto with the screws 16. The mounting bracket 30 preferably abuts and attaches to the aircraft with the gasket 32 interposed therebetween. The gasket 32, in addition to aiding in the securement of the light 10 to the aircraft, also preferably provides thermal insulation and EMI suppression as discussed above. The mounting bracket 30 may be modified in various ways to facilitate the use of the light 10 in various locations about the aircraft, as may be desired.

FIG. 2 also illustrates a stress relief 36 which attaches to an interior annular lip (not shown) within the housing 12 via screws 38. The stress relief 36 clamps wires (not shown) that extend therethrough from the aircraft to the electrical components in the light 10 (which will be discussed in greater detail infra) to thereby ensure that the wires are properly and reliably secured with respect to their respective components. A solid state illumination device 40, a printed wire assembly 42, and a foil heater 44 engage a counterbore 46 at the front portion 18 of the housing 12. The printed wire assembly 42 secures to an interior annular housing lip 48 in the housing 12 and receives the power wire(s) (not shown) that extend through the stress relief 36. The printed wire assembly 42 preferably contains noise suppression circuitry, rectification circuitry, voltage reduction circuitry, and voltage clamping circuitry (not shown) for delivering power to the solid state illumination device 40, as will be discussed in greater detail infra. In addition, the printed wire assembly 42 also preferably contains at least a portion of the thermal compensator (e.g., thermal compensation control circuitry) which is used to maintain the solid state illumination device 40 above a minimum threshold temperature.

The foil heater 44 engages an inner diameter 50 of the counterbore 46 and preferably adheres thereto with a pressure sensitive adhesive. The solid state illumination device 40 also fits within the counterbore 46 and is secured to the housing 12 via screws 54. The solid state illumination device 40 is in thermal communication with the foil heater 44, preferably by maintaining thermal contact between the foil heater 44 and an outer casing 56 of the illumination device 40. The thermal contact between the foil heater 44 and the outer casing 56 of the solid state illumination device 40 may be further enhanced, for example, by interposing a thermally conductive adhesive or gel, etc. therebetween, as may be desired. The foil heater 44 is activated and deactivated, respectively, in accordance with a control signal from the printed wire assembly 42 in order to maintain the solid state illumination device 40 above a minimum temperature threshold.

The components within the housing 12 (e.g., the solid state illumination device 40, the printed wire assembly 42, the foil heater 44, etc.) are protected from external elements by the light enclosure 20 which substantially abuts the housing 12 and is coupled thereto via the collar or ferrule 22. The ferrule 22 couples to the housing 12 with screws through the holes 58 and the enclosure 20 attaches to the ferrule 22, preferably with a flexible snap fit.

Figure 3:
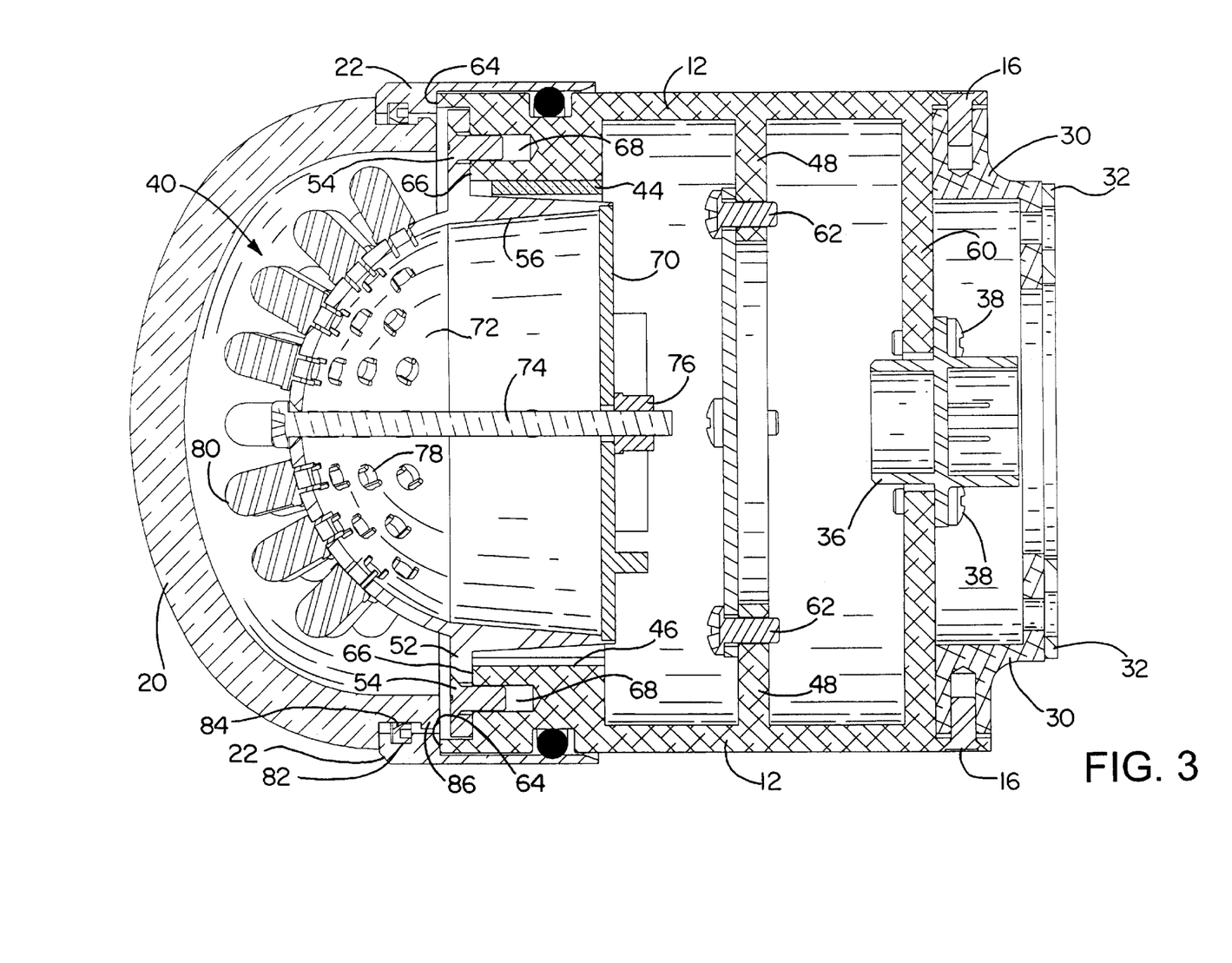
FIG. 3 is a cross-sectional view of the solid state tail light of FIG. 1.

A cross section of the light components of the light 10, as assembled, is illustrated in FIG. 3. As discussed above in conjunction with FIG. 2, the gasket 32 abuts the mounting bracket 30 which is attached to the housing 12 via the screws 16. The stress relief 36 attaches to an interior annular ring or lip 60 of the housing 12 via the screws 38. As discussed above, the stress relief 36 clamps the power wires that extend therethrough from the aircraft to relieve stress at the wire connection points. Alternatively, however, the component 36, may consist of an adapter plug for coupling the aircraft power to the printed wire assembly 42.

The printed wire assembly 42 is secured within the housing 12 by attaching to the other interior annular lip 48 via screws 62. The front portion 18 of the housing 12 contains the counterbore 46 and an abutment surface 64 which abuts the ferrule 22. The counterbore 46 itself has a front face 66 which abuts the flange 52 of the solid state illumination device 40. The face 66 has holes 68 therein to secure the flange 52 thereto via the screws 54. The outer casing 56 of the illumination device 40 fits within the counterbore 46 and has the foil heater 44 interposed therebetween along at least a portion thereof. A backplate 70 of the solid state illumination device 40 secures a reflector 72 (which may alternatively be called a substrate having an engagement surface) and the casing 56 thereto via a screw 74 and nut 76 assembly.

The solid state illumination device 40 has a plurality of holes 78 in the reflector 72 which accommodate a plurality of solid state illumination elements 80 therein. Preferably, the reflector 72 contains a reflective material on its surface to optimize the illumination of the illumination elements 80. In addition, the reflector 72 is preferably non-planar in order for at least one of the illumination elements 80 which abut against the engagement surface to have an illumination axis which is not parallel with other illumination elements 80. Alternatively, however, the reflector 72 may be planar with one or more of the illumination elements 80 being directionally inserted into the holes 78 or bent after their insertion to effectuate a non-parallel illumination axis with respect to the other illumination elements 80. In the above manner, the illumination elements 80 in conjunction with the reflector 72 may be utilized to provide a customized illumination pattern as may be desired.

The light enclosure 20 couples to the housing 12 via the ferrule 22. The ferrule 22 has a recess 82 which accommodates a washer 84 therein. The enclosure 20 includes a protrusion 86 along its radial end for engaging the washer 84 and securing the enclosure 20 thereto, preferably via a snap fit type arrangement.

Figure 4A:
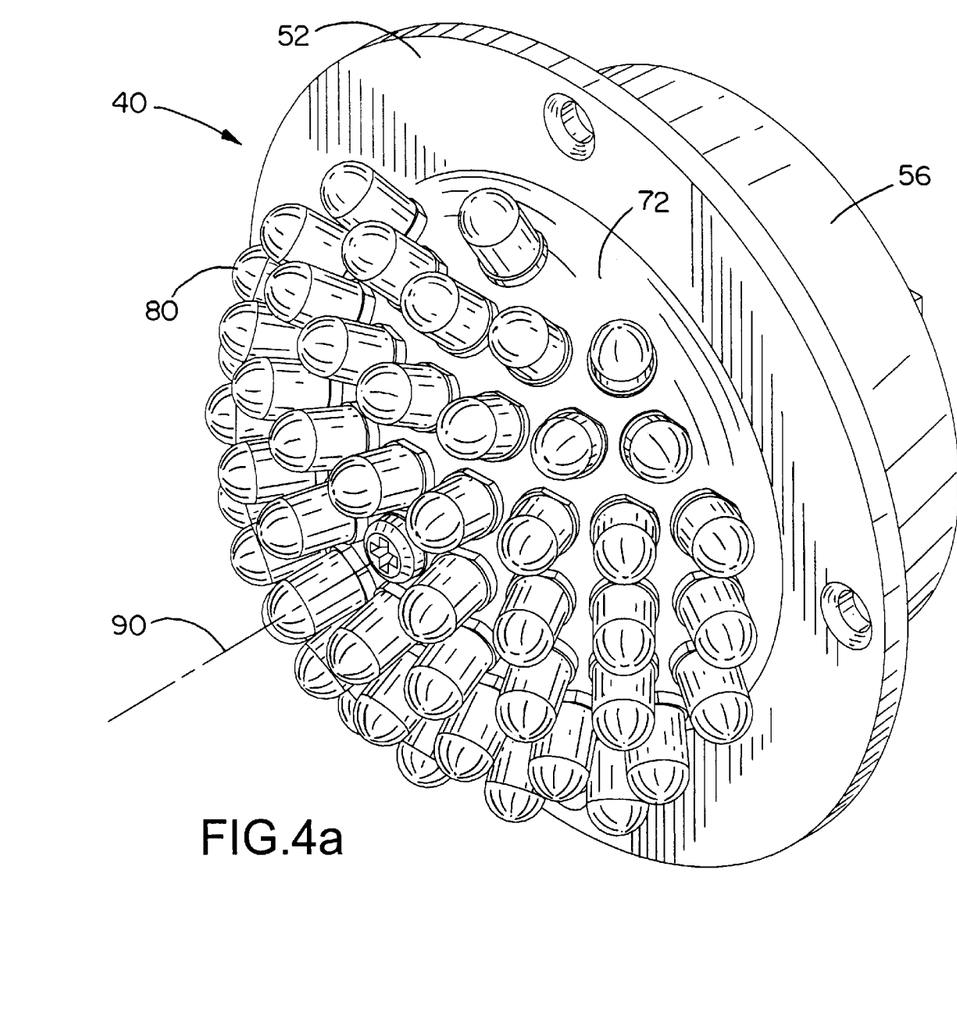
FIG. 4*a* is a perspective view of an LED cluster for use in the solid state tail light of FIG. 1.

A perspective view of the solid state illumination device 40 is illustrated in FIG. 4a. Preferably, each of the illumination elements 80 are LEDs, however, other solid state illumination devices (e.g., a solid state laser) are contemplated as falling within the scope of the present invention. Thus the illumination device 40, according to the preferred embodiment of the present invention, may alternatively be referred to as an LED cluster. Because the illumination source in the present invention is a solid state illumination device, the light is substantially more rugged and reliable than prior art lights when operating in environments experiencing substantial vibrational loading such as on an aircraft. Solid state illumination devices, due to their inherent structure, are more rugged since they do not employ fragile components (such as the filaments in prior art incandescent bulbs) which are vulnerable to failure due to large vibrations and thus the present invention provides improved reliability over the prior art.

Each illumination element or LED 80 has an illumination axis 90 at which its maximum illumination intensity is achieved. An exemplary LED is a GaInN device having a 5 mm dimension. Each LED in the exemplary LED cluster has a 25 mA forward DC current and a 5 volt reverse voltage rating. The LED according to the preferred embodiment of the present invention has a nominal thermal operating range of about −20 C to about 80 C and a viewing angle (2) of about ±15 degrees about the illumination axis 90. The illumination intensity of each exemplary LED is about 1600 mCd to about 2800 mCd.

As can be seen from the viewing angle specification, the illumination of each illumination element 80 is substantially directional which allows the selective positioning of the elements 80 on the reflector 72 to provide a customizable illumination pattern. Such a feature is highly desirable in applications such as external aircraft tail lights which require a 20 Cd minimum illumination intensity in the horizontal plane and a decreasing illumination intensity with an increasing vertical angle. Thus the LED cluster 40 may have the plurality of LEDs 80 selectively positioned to meet a variety of desired illumination intensity patterns.

As illustrated in FIG. 4a, each LED 80 has a direction extending substantially normal to a surface of the reflector 72. In the exemplary configuration, therefore, the directionality of the illumination pattern can be further customized by varying a surface profile of the reflector 72. Alternatively, however, the reflector 72 may be a planar surface and the illumination pattern may be varied by directionally inserting the LEDs 80 into the reflector 72 or bending the LEDs via insulated extension leads that protrude through the holes 78 of the reflector 72.

Figure 4B:
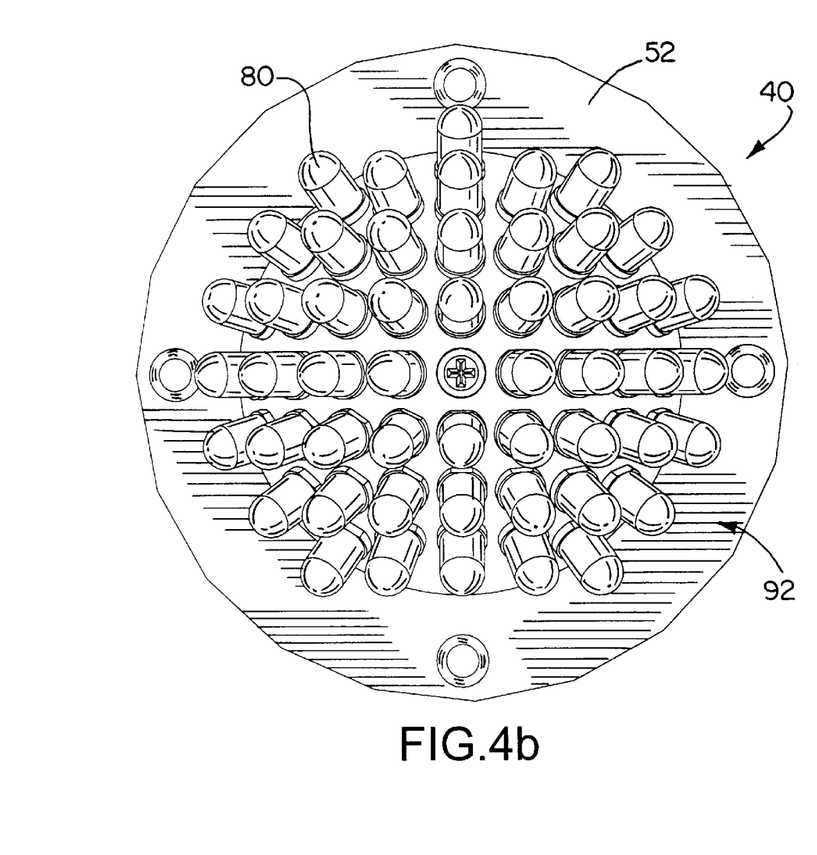
FIG. 4*b* is a front view of the LED cluster of FIG. 4*a* illustrating a customized illumination pattern.
Figure 4C:
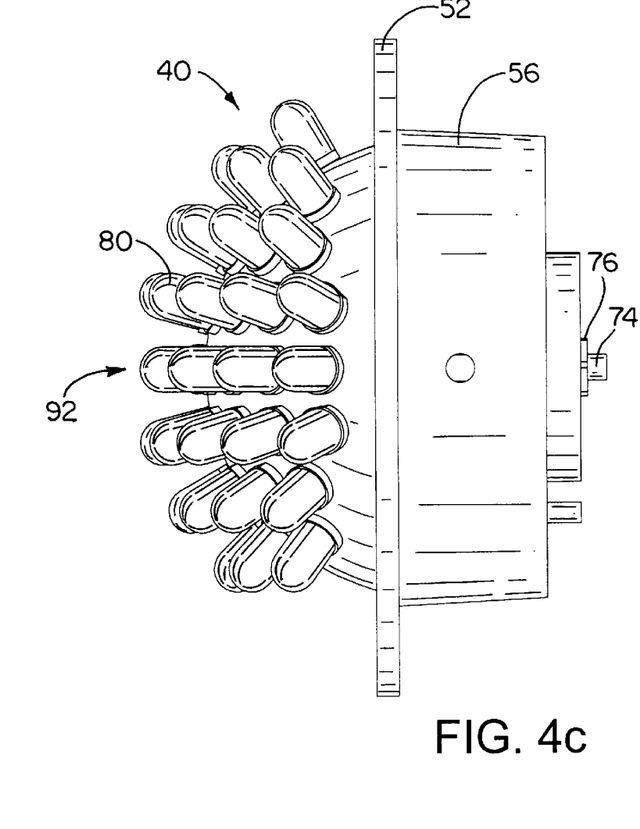
FIG. 4*c* is a side view of the LED cluster of FIG. 4*a;*

FIGS. 4b and 4c are front and side views of the LED cluster 40 which illustrate an illumination pattern according to a preferred embodiment of the present invention. As illustrated, the LED cluster 40 includes fifty-one (51) discrete LEDs in a pattern 92. The pattern 92 provides a minimum intensity in the horizontal plane (±70 degrees) of about 20 Cd and an intensity distribution in the vertical plane of about 2 Cd at ±40 degrees and about 1 Cd at ±90 degrees. The reflector 72 is non-planar and contains a reflective material such as Delrin/Acetal to provide a white surface to thereby optimize the illumination of the illumination device 40. Alternatively, other types of surfaces such as a mirror-like surface may be utilized and are contemplated as falling within the scope of the present invention.

As highlighted supra, the LEDs have a nominal temperature range within which the operation of the LEDs are reliable (e.g., about −20 C to about 80 C). Because the light 10 may experience temperatures as low as 40 C when the aircraft is at high altitudes, the solid state illumination device 40 is in thermal communication with the foil heater 44. When the temperature of the solid state illumination device 40 (e.g., LED cluster) falls below a predetermined threshold temperature (e.g., about 0 C), the foil heater 44 turns on and provides heat to the solid state illumination device 40 in order to maintain the light 10 within the nominal temperature range. Consequently, the light 10 incorporates thermal compensation. Alternatively, however, the present invention may provide thermal compensation in accordance with other performance criteria, for example, by sensing a performance parameter and providing compensation in response thereto. In addition, thermal compensation may be provided to maintain the light within a predetermined temperature range.

Figure 5:
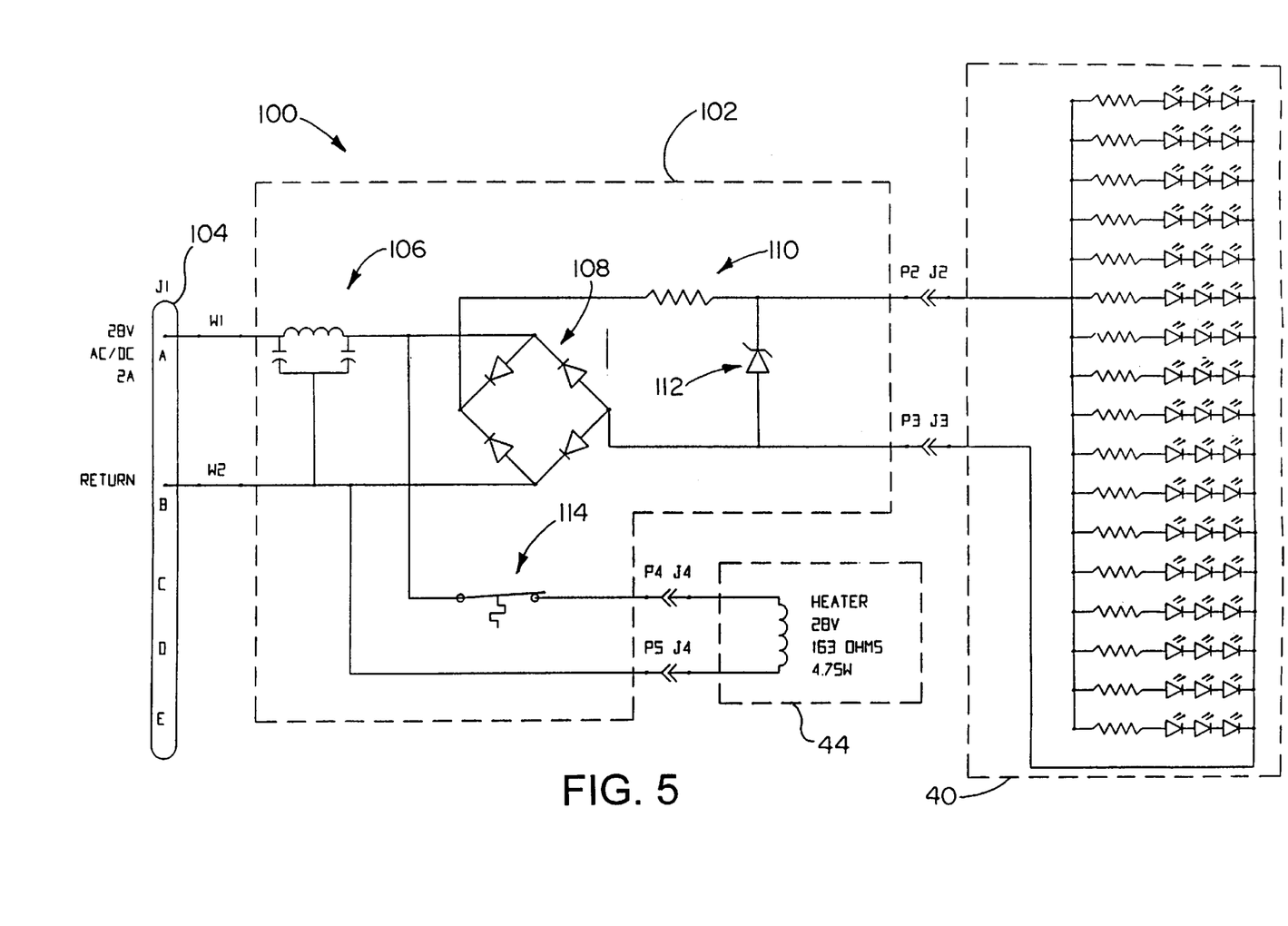
FIG. 5 is a circuit diagram illustrating a control circuit and compensation circuit for providing power to the LED cluster and heater according to the present invention.

FIG. 5 is a circuit diagram 100 illustrating a power delivery circuit 102, the heater 44 and the solid state illumination device 40. According to a preferred embodiment of the present invention, the power delivery circuit 102 resides on the printed wire assembly 42 which attaches to the housing 12 as illustrated in FIGS. 2 and 3. Power is delivered to the power delivery circuit 102 by coupling to a connector 104 via the power wiring that passes through the stress relief 36 as discussed supra. The power delivery circuit 102 receives the aircraft power at the connector 104 and converts the power to the proper form and level for powering the solid state illumination device 40.

The aircraft power may be supplied to the solid state illumination device 40 whenever the aircraft power is supplied to the aircraft (e.g., when the aircraft is in operation). Alternatively, however, additional control circuitry (e.g., a switch, a potentiometer, a processor, etc.) may be included within or external to the power delivery circuit 102 to provide illumination control such as turning the solid state illumination device 40 on and off or varying the illumination intensity of the device 40, as may be desired.

The power delivery circuit 102 in the preferred embodiment includes a noise suppression circuit 106, a rectification circuit 108, a voltage reduction circuit 110 and a voltage clamping circuit 112. The noise suppression circuit 106 preferably includes an LC arrangement that operates as a low pass filter to block high frequency voltage transients or noise from passing to, and interfering with, the LED cluster 40. Although an LC arrangement is preferred, any filtering circuit may be utilized and is contemplated as falling within the scope of the present invention. The rectification circuit 108 includes a typical diode rectifier arrangement and converts an AC signal to DC as is well known by those skilled in the art. When the aircraft is in flight, AC power (28 V) is utilized. In such a case, the 28 V AC signal is rectified to a 28 V DC signal. When the aircraft is not in flight, DC power (28 V DC) is utilized. Thus the present invention is operable in either type power situation.

The voltage reduction circuit 110 is preferably a resistor (e.g., 25, 7 W rating), however; any voltage reduction type circuitry may be utilized and is contemplated as falling within the scope of the present invention. The voltage reduction circuit 110 reduces the 28 V DC voltage from the rectification circuit 108 to about 15 V for use by the LED cluster 40. If for any reason the voltage reduction circuit 110 fails, the voltage clamping circuit 112 clamps the voltage going to the LED cluster 40 to 15 V to thereby prevent damage to the LED cluster 40. Preferably, the voltage clamping circuit 112 includes a zener diode having a zener voltage of about 15 V, however, any form of clamping circuitry may be utilized and is contemplated as falling within the scope of the present invention.

The power delivery circuit 102 also includes a thermal switch 114 as an exemplary controller (e.g., a Reed type switch manufactured by Thermodisc having a 1 A and 10 W rating) which is closed when the switch temperature is below about 0 C. According to a preferred embodiment of the present invention, the thermal switch 114 is in close proximity to the LED cluster 40 so that the temperature sensed at the thermal switch 114 is approximately the same as the temperature at the LED cluster 40. Alternatively, the thermal switch 114 may not necessarily be located in close proximity to the LED cluster 40. In such case, the thermal switch 114 may be activated at various different thermal thresholds to account for any thermal gradients which may exist between the LED cluster 40 and the thermal switch 114.

When closed, the switch delivers 28 V to the heater 44 (e.g., a foil heater having a 163, 4.75 W rating) which is activated. When activated, the heater 44, which is in thermal communication with the LED cluster 40, maintains the LED cluster at a temperature above about 0 C. When the switch temperature reaches about 20 C, the thermal switch 114 opens and deactivates the heater 44. In the above manner, the thermal switch 114 and the heater 44 operate together to provide thermal compensation for the light 10 and thereby maintain the light above a minimum temperature threshold. Consequently, the light 10 will operate more efficiently and reliably across variations in the thermal environment.

The heater 44 of FIG. 5 is coupled to the aircraft power, via the thermal switch 114, through the same electrical connection as the LED cluster 40. Consequently, power to control the temperature via the heater 44 (and thus provide thermal compensation) is supplied when the LED cluster 40 is providing illumination. Alternatively, the heater 44 may be powered independently of the LED cluster 40 which therefore allows thermal compensation to be provided when the LED cluster 40 is off. In such a case, whenever illumination is required or desired, such illumination may be provided immediately since the LED cluster 40 will be at a sufficient operating temperature due to the thermal compensation, thus eliminating a potential need for a warm-up period prior to obtaining the desired illumination.

Although the heater 44 in a preferred embodiment of the present invention is a foil heater as illustrated in FIGS. 2 and 3, thermal compensation can be provided in a plethora of ways and each is contemplated by the present invention. For example, the heater 44 may consist of a resistor bank near the LEDs 80 and provide resistive type heating. Alternatively, a fan may be mounted in the housing and heat the LEDs using heat drawn from the aircraft. In addition, although a thermal switch 114 is utilized to activate the heater 44, various types of thermal sensing devices or circuits may be utilized. For example, a changing resistance value over temperature may be sensed (e.g., a resistance temperature device (RTD)) to detect the temperature at or near the LED cluster 40. Alternatively, a thermocouple may be utilized to detect the temperature at or near the LED cluster 40. Any type of thermal detection is contemplated as falling within the scope of the present invention. In addition, other more sophisticated heater control mechanisms may be used to, for example, vary the power to the heater 44, thus providing increased flexibility in providing thermal compensation to the LED cluster 40.

The LED cluster 40 couples to the power delivery circuit 102 and receives about 15 V DC. The LED cluster 40 preferably includes an array of LEDs (e.g., seventeen (17) arrays of three series-connected LEDs). Each LED array preferably includes a series-connected resistor for limiting the current to the LEDs (e.g., to about 300 mA). Each array of three series-connected LEDs have 15 V DC across them, thus each LED has about 5 V across it, which causes the diode to conduct and provide illumination according to convention LED operation. Although the above array configuration is preferred, different array configurations using different voltages may also be utilized and such variations are contemplated as falling within the scope of the present invention.

Figure 6:
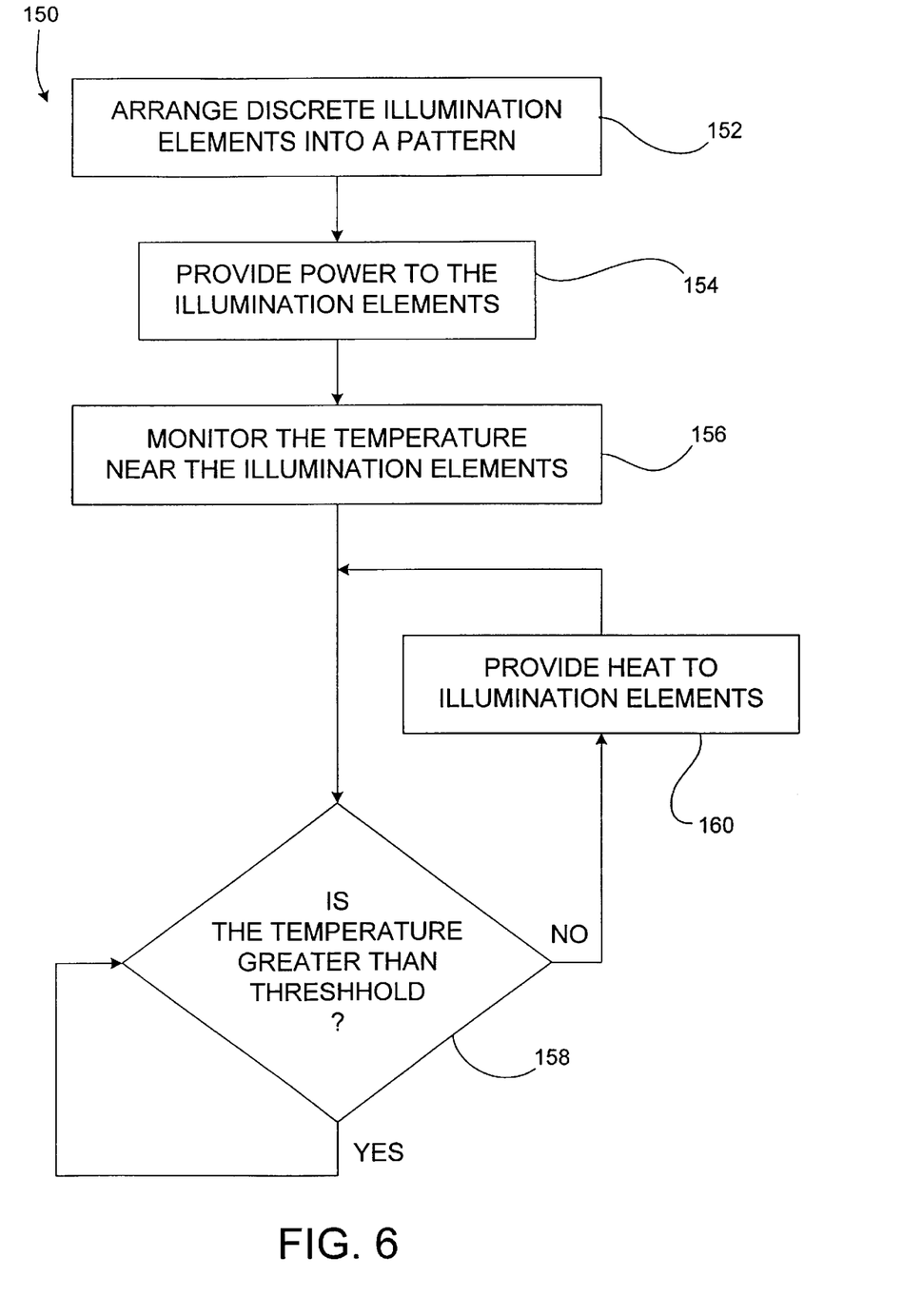
FIG. 6 is a flow chart illustrating a method of externally illuminating an aircraft component according to the present invention.

The present invention may alternatively be characterized as a method of providing illumination in high vibration environments, as illustrated in the flow chart of FIG. 6. The method 150 includes arranging a plurality of discrete, solid state illumination elements (e.g., LEDs) at step 152 in order to effectuate a customized illumination pattern. Power is provided to the illumination elements at step 154 and the solid state illumination elements are thermally monitored at step 156. If the detected temperature is greater than a predetermined thermal threshold (e.g., about 0 C) at step 158 (YES), then no thermal compensation is provided and the monitoring of step 156 continues. If, however, the detected temperature falls below the threshold (NO) at step 158, heat is provided to the illumination elements at step 160 by activating a heater to raise the temperature at or near illumination elements above the temperature threshold, for example.

The present invention has been discussed above in conjunction with an aircraft. The present invention, however, is equally applicable to any type of illumination application in which high vibrational loads and substantial thermal fluctuations are experienced. Such applications include, but are not limited to, other vehicles, industrial applications, etc. It should be appreciated that such alternative applications are contemplated as falling within the scope of the present invention.

Although the invention has been shown and described with respect to a certain preferred embodiment or embodiments, it is obvious that equivalent alternations and modifications will occur to others skilled in the art upon the reading and understanding of this specification and the annexed drawings. In particular regard to the various functions performed by the above described components (assemblies, devices, compositions, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments, as may be desired and advantageous for any given or particular application.

What is claimed is:

1. A vehicle light for use in applications experiencing wide temperature variations and vibrational loading, comprising:
   a solid state illumination device including a plurality of light emitting diodes (LEDs); and
   a thermal compensator in thermal communication with the solid state illumination device, wherein the thermal compensator maintains the solid state illumination device above a temperature threshold.

2. The vehicle light of claim 1, wherein the plurality of LEDs are positioned in accordance with a desired illumination pattern.

3. The vehicle light of claim 2, further comprising an LED engagement structure for accommodating the plurality of LEDs in the position to effectuate the desired illumination pattern.

4. The vehicle light of claim 3, wherein a surface of the engagement structure comprises a reflective material for optimizing an illumination of the LEDs.

5. The vehicle light of claim 1, wherein the thermal compensator comprises a heating means for maintaining the solid state illumination device above the temperature threshold.

6. The vehicle light of claim 5, wherein the heating means comprises a heating element, a temperature sensor and a controller, wherein the controller controls power to the heating element based on a temperature sensed by the temperature sensor at or near the solid state illumination device.

7. The vehicle light of claim 6, wherein the temperature sensor comprises a resistance temperature device or a thermocouple.

8. The vehicle light of claim 6, wherein the temperature sensor and the controller comprise a thermal switch coupled to the heating element, wherein the thermal switch senses a temperature near the solid state illumination device and activates the heating element when the temperature falls below a predetermined value.

9. The vehicle light of claim 5, wherein the heating means is integrated with the solid state illumination device to facilitate thermal conduction between the heating means and the solid state illumination device.

10. The vehicle light of claim 5, wherein the heating means comprises a foil heater having a shape which substantially engages the solid state illumination device to effectuate a substantially efficient thermal transfer therebetween.

11. The vehicle light of claim 5, further comprising a power delivery circuit for coupling vehicle power to the solid state illumination device.

12. The vehicle light of claim 11, wherein the power delivery circuit further comprises a rectifier circuit for converting an AC voltage to a DC voltage.

13. The vehicle light of claim 12, wherein the power delivery circuit further comprises a voltage reduction circuit coupled to the rectifier circuit for reducing the DC voltage from the rectifier circuit to a desired voltage level.

14. The vehicle light of claim 13, wherein the voltage reduction circuit further comprises a clamping circuit for limiting a voltage at the solid state illumination device to a predetermined value.

15. The vehicle light of claim 11, wherein the power delivery circuit further comprises a noise reduction circuit for limiting incoming signals from the aircraft to a predetermined frequency range.

16. A method of providing a positional indicia on a vehicle component, comprising the steps of:
   illuminating an area local to the vehicle component using a solid state illumination device including a plurality of light emitting diodes; and
   maintaining the solid state illumination device above a predetermined temperature threshold by monitoring a temperature at or near the solid state illumination device and controlling the temperature at or near the solid state illumination device based on the monitored temperature.

17. The method of claim 16, comprising the step of arranging the plurality of LEDs in a pattern, thereby providing an illumination pattern corresponding to the pattern.

18. The method of claim 16, wherein controlling the temperature comprises providing heat to the solid state illumination device if the monitored temperature falls below a predetermined level.

19. The method of claim 18, wherein providing heat to the solid state illumination device comprises activating a heater until the temperature rises above a second predetermined level.

20. A vehicle light for use in application experiencing vibrational loading, comprising:
   a solid state illumination device including
      a reflector having a convex reflective surface, and
      a plurality of light emitting diodes mounted to the convex reflective surface,
      wherein each light emitting diode has an illumination axis, and wherein the illumination axes extend generally perpendicular to the convex reflective surface.

21. A light unit, comprising:
   a housing;
   a solid state illumination device coupled to the housing;
   an optical window coupled to the housing and providing light from the solid state illumination device to pass therethrough; and
   a heater coupled to the housing for maintaining a temperature of the solid state illumination device above a temperature threshold.

* * * * *